United States Patent [19]

Thomas et al.

[11] Patent Number: 4,734,674

[45] Date of Patent: Mar. 29, 1988

[54] TIRE PRESSURE WARNING SYSTEM

[75] Inventors: Perry W. Thomas, Grandview, Mo.; Rex O. Bare, Irvine; Earl F. Robinson, El Toro, both of Calif.; Wayne Hayob, Lenexa, Kans.

[73] Assignee: Jack Taylor, Mobile, Ala.

[21] Appl. No.: 720,709

[22] Filed: Apr. 8, 1985

[51] Int. Cl.$^4$ .................... B60C 23/00; H01H 35/24
[52] U.S. Cl. .................... 340/58; 200/61.25; 340/539
[58] Field of Search ............ 340/58, 539; 200/61.25; 73/146.5, 146.8

[56] References Cited

U.S. PATENT DOCUMENTS

| | | | |
|---|---|---|---|
| 2,948,256 | 8/1960 | Tapp | 73/146.8 |
| 3,111,644 | 11/1963 | Froelich et al. | 73/146.8 X |
| 3,177,724 | 4/1965 | Trinca | 73/146.8 |
| 3,178,686 | 4/1965 | Mills | 340/58 |
| 3,500,458 | 3/1970 | Cannalte | 455/115 |
| 3,500,459 | 3/1970 | Battin et al. | 455/115 X |
| 3,533,063 | 10/1970 | Garcia | 340/58 |
| 3,697,944 | 10/1972 | Murano | 340/58 |
| 3,713,092 | 1/1973 | Ivenbaum | 340/58 |
| 3,787,806 | 1/1974 | Church | 340/58 |
| 3,796,990 | 3/1974 | Hill | 340/58 |
| 3,805,229 | 4/1974 | Murphy | 340/58 |
| 3,810,090 | 5/1974 | Davis, Jr. et al. | 340/58 |
| 3,835,451 | 9/1974 | Church | 340/58 |
| 4,037,192 | 7/1977 | Cowit | 340/58 |
| 4,048,614 | 9/1977 | Shumway | 340/58 |
| 4,056,815 | 11/1977 | Anderson | 340/539 |
| 4,059,823 | 11/1977 | Martin et al. | 340/58 |
| 4,103,282 | 7/1978 | Cook | 340/58 |
| 4,137,520 | 1/1979 | Deveau | 340/58 |
| 4,160,234 | 7/1979 | Karbo et al. | 340/58 |
| 4,186,377 | 1/1980 | Barabino | 340/58 |
| 4,191,948 | 3/1980 | Shockdale | 340/539 |
| 4,210,898 | 7/1980 | Betts | 340/58 |
| 4,229,728 | 10/1980 | Tremba | 73/146.5 |
| 4,237,728 | 12/1980 | Betts et al. | 340/58 X |
| 4,308,520 | 12/1981 | Darlington | 340/58 |
| 4,311,985 | 1/1982 | Gee et al. | 340/58 |
| 4,316,176 | 2/1982 | Gee et al. | 340/58 |
| 4,334,215 | 6/1982 | Frazier et al. | 340/58 X |
| 4,335,283 | 1/1982 | Migrin | 200/61.25 |
| 4,384,482 | 5/1983 | Snyder | 73/146.5 |
| 4,425,558 | 1/1984 | McConchie | 340/58 |
| 4,426,637 | 1/1984 | Apple et al. | 340/825.65 |
| 4,443,785 | 4/1984 | Speranza | 340/58 |
| 4,476,803 | 10/1984 | Malec | 116/34 |
| 4,510,484 | 4/1985 | Snyder | 340/58 |
| 4,514,731 | 4/1985 | Falck et al. | 340/636 X |

*Primary Examiner*—James L. Rowland
*Assistant Examiner*—Thomas J. Mullen, Jr.
*Attorney, Agent, or Firm*—Knobbe, Martens, Olson & Bear

[57] ABSTRACT

A tire pressure warning system, including a valve stem-mounted tire pressure detector, including means for sensing the tire pressure and means for transmitting an encoded signal when the tire pressure drops below a predetermined level, and a receiver that can receive and recognize the encoded signal, differentiate between various encoded signals, and provide a warning signal to the vehicle operator. The inside of the tire pressure detector is hermetically sealed; inside the sealed portion is a unique on/off switch that can be externally actuated without compromising the seal.

24 Claims, 30 Drawing Figures

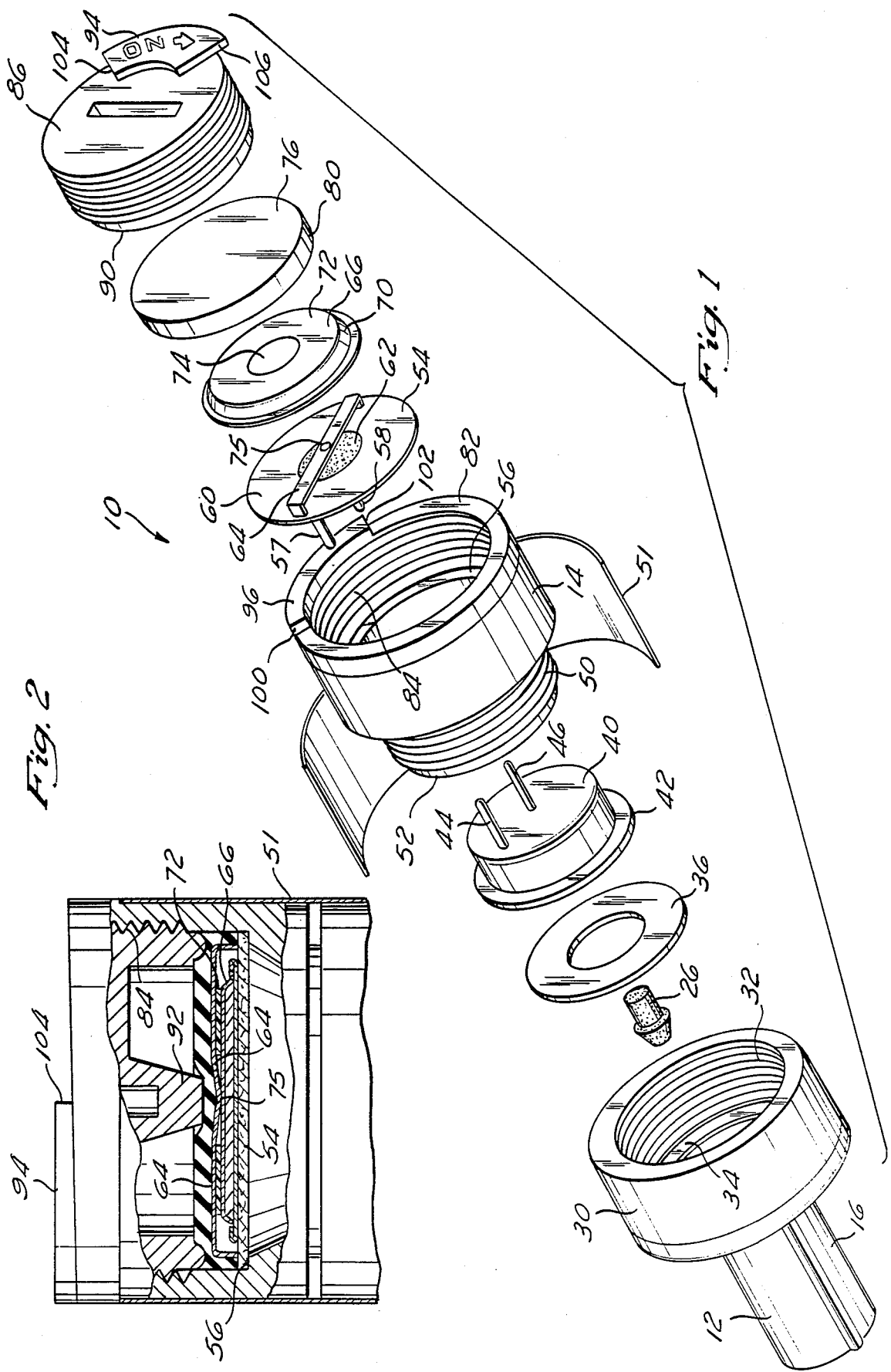

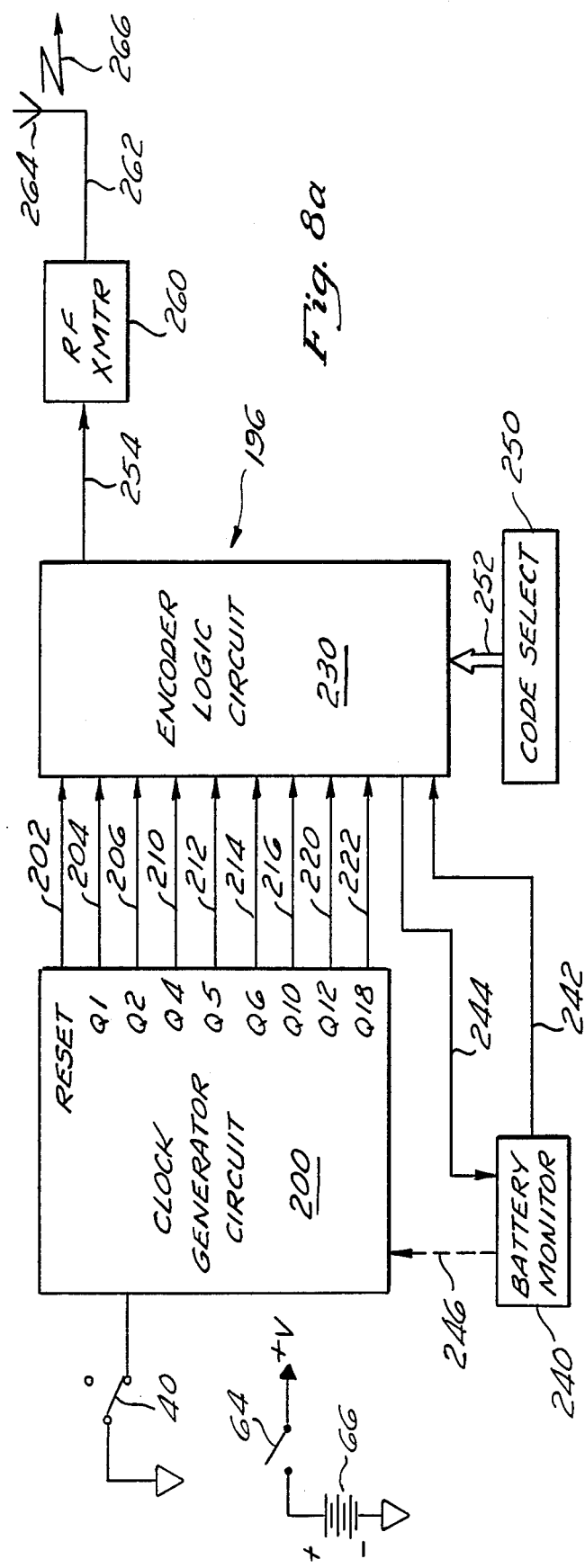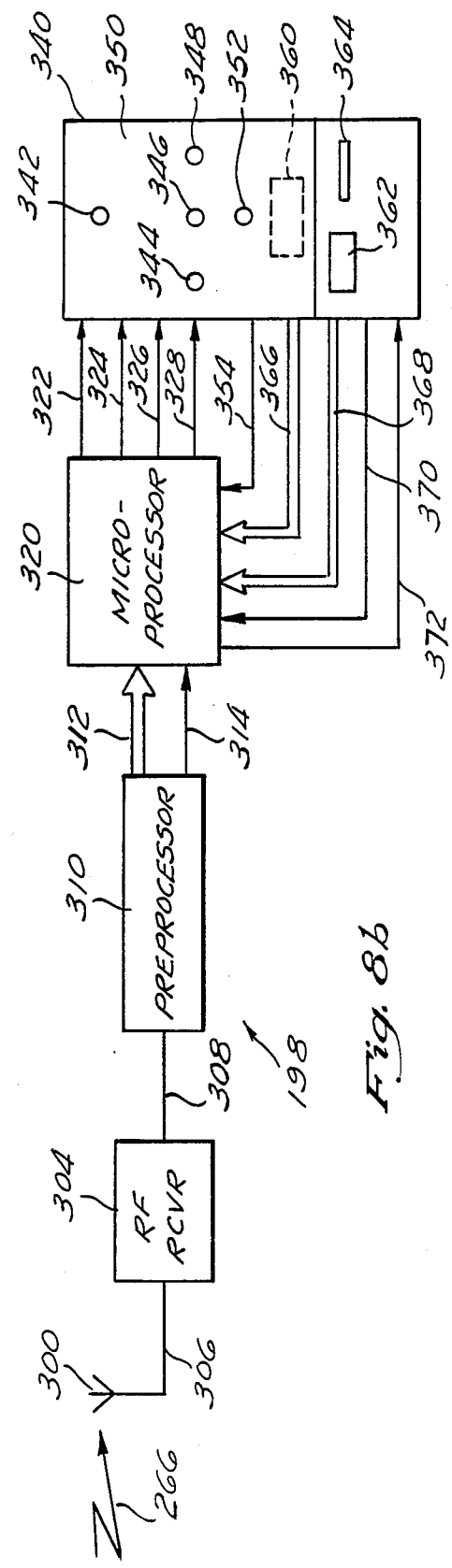

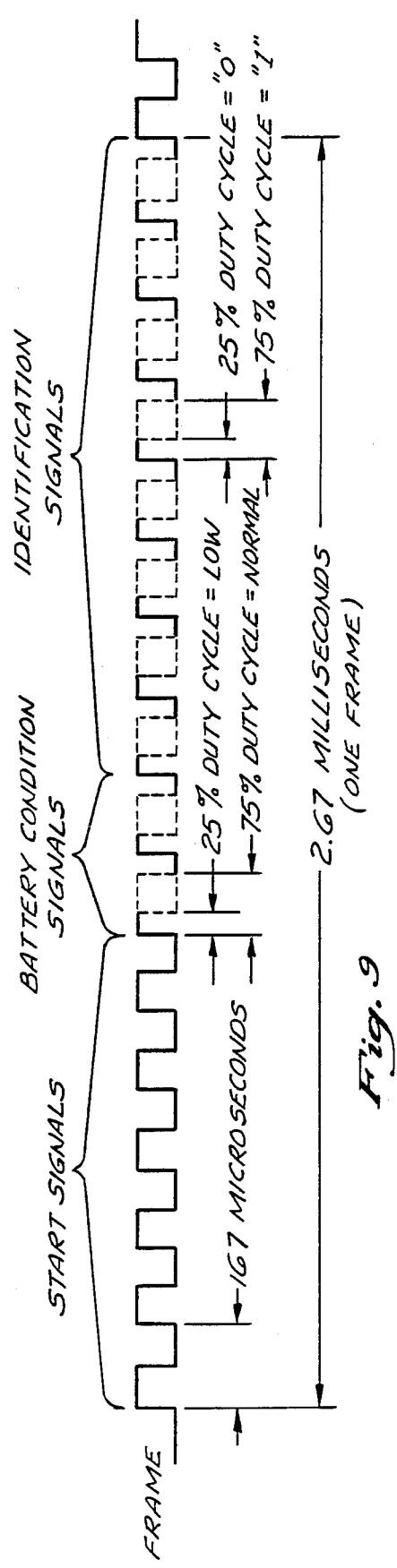
Fig. 9
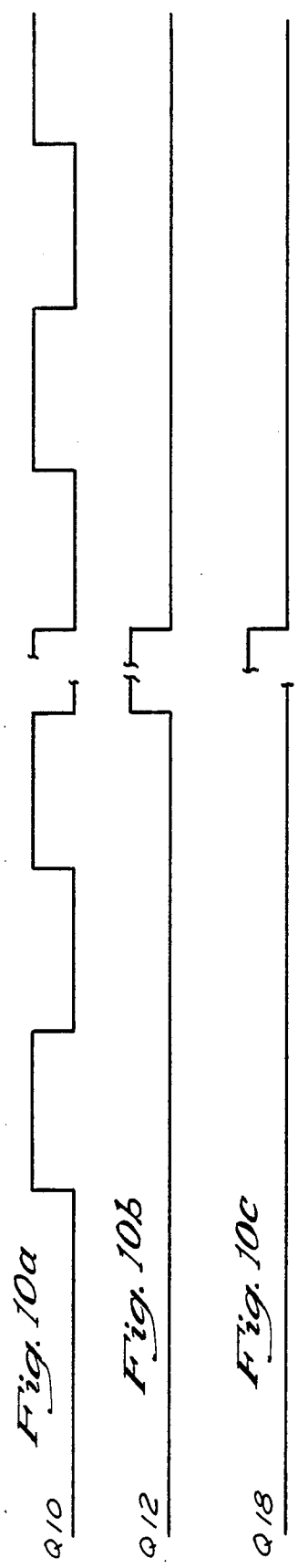
Fig. 10a
Fig. 10b
Fig. 10c
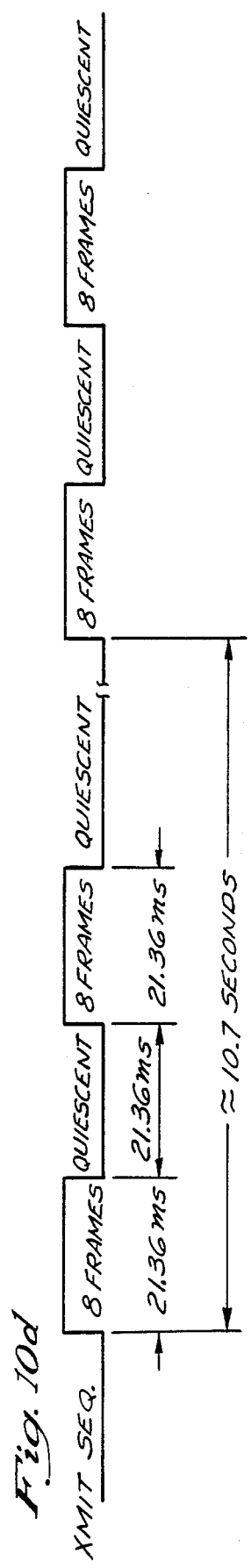
Fig. 10d

Fig. 13a RESET
Fig. 13b CLOCK
Fig. 13c Q1
Fig. 13d Q2
Fig. 13e Q4
Fig. 13f Q5
Fig. 13g Q6
Fig. 13h LOAD

Q4·Q5

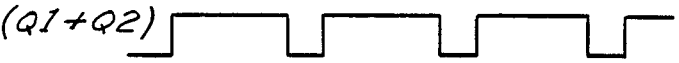
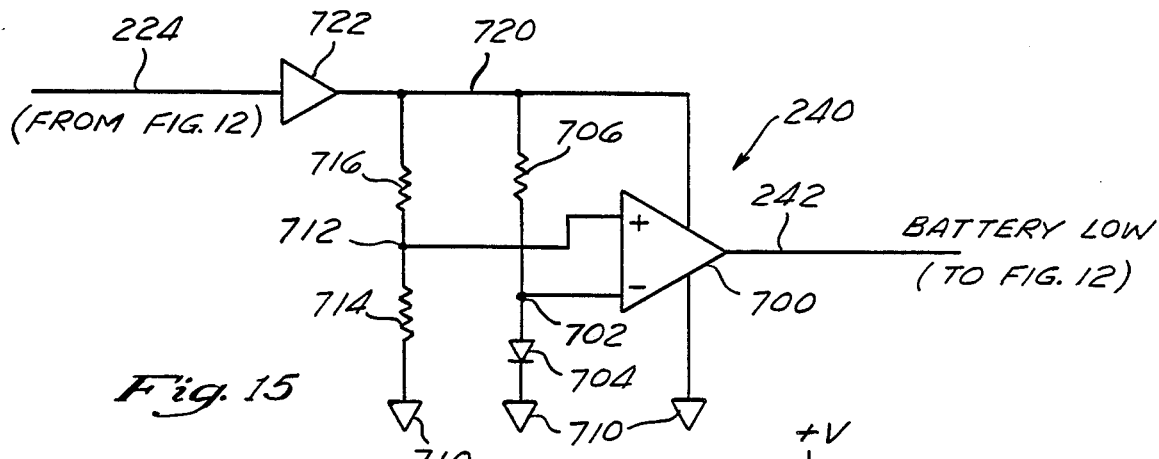
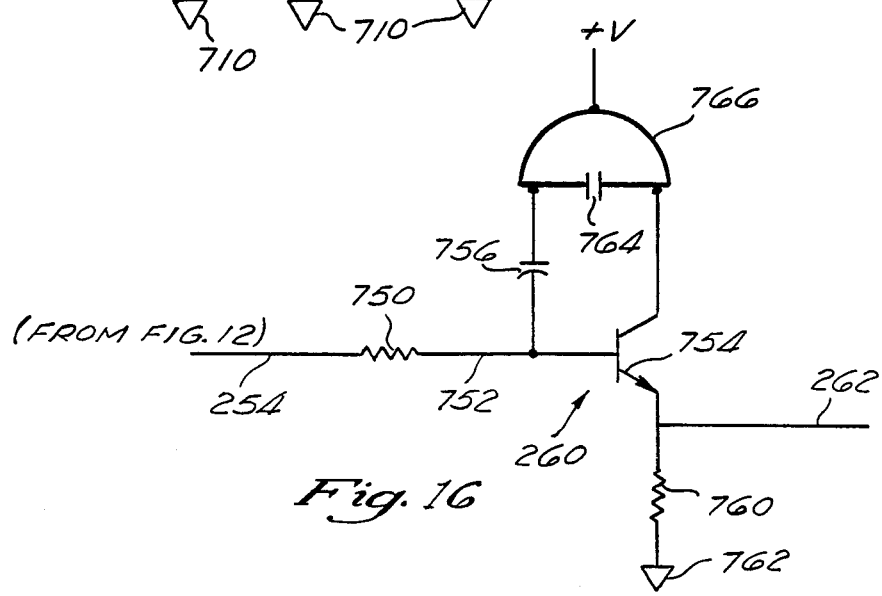

TIRE PRESSURE WARNING SYSTEM

BACKGROUND OF THE INVENTION

This invention relates to a system for monitoring the pressure in a tire and indicating to a vehicle operator an abnormal tire pressure condition.

A number of devices are known for use with pneumatic vehicle tires for monitoring the pressure inside the tire and transmitting information to a remote receiver. For example, U.S. Pat. No. 3,713,092 discloses a cylindrical device that is screwed onto a tire valve stem that transmits a radio signal in response to a low tire pressure condition. Similar devices are disclosed in U.S. Pat. Nos. 4,037,192 and 4,048,614.

These prior art devices have not been widely commercialized for a number of reasons. Many of the devices require mounting inside of a tire or inner tube or on the wheel, and are thus difficult to service and monitor. Other devices, which are mounted on the valve stem, are easily stolen, lost, or vandalized. Battery life in this type of device has been quite limited; hence, the absence of a signal has not necessarily meant the condition of the tire was satisfactory. The battery life problem is exacerbated by the fact that when a low tire pressure condition occurs, the load placed on the battery by the transmitter rapidly drains the battery and renders the device inoperable.

Still another problem is the difficulty in prior art systems of determining which tire is low. This difficulty is particularly acute with large commercial vehicles, which often have eighteen or more wheels.

Accordingly, it is an object of the present invention to provide a tire pressure warning system that notifies the user both when a tire is low and when the battery is low. It is another object of the present invention to provide a tire pressure warning system that facilitates determination of which tire has a low pressure condition. Still another object of the present invention is to provide a tire pressure transmitter that causes very low battery drain.

Another object of the present invention is to provide a very small transmitter package that can be mounted on the valve stem of the tire.

Yet another object of the present invention is to provide a theft-deterrent system for the transmitter.

Another object of the present invention is to provide a transmitter that can easily be tested.

Still another object of the present invention is to provide a completely sealed tire pressure transmitter that can easily be turned on and off without disturbing that seal.

SUMMARY OF THE INVENTION

In furtherance of the foregoing objects, there is provided in accordance with the present invention a tire pressure warning system, including a first detector having a generally cylindrical body portion with a bottom end adapted to mount on a tire valve stem, a top end opposite the bottom end, an inside, and an outside, a pressure transducer in the body for detecting the pressure in the tire, and an electrical switch actuated by the pressure transducer, so that the switch is either closed or open at atmospheric pressure and any pressure below a predetermined, higher pressure (the "low pressure" state indicative of underinflation), and is in the opposite state (indicative of a properly inflated tire) at any pressure above the predetermined pressure. A sensor is provided in the body for sensing whether the switch is open or closed. The sensor can be made to operate with either a switch that is normally open at atmospheric pressure or with a switch that is normally closed. There is a transmitter in the body that is actuated by the sensor when the switch is in the low pressure state, sending a plurality of coded RF signal bursts of a predetermined code sequence though an RF output to indicate a tire pressure below the predetermined pressure. A counter in the body counts the number of signal bursts transmitted and disables the transmitter when a predetermined number of bursts have been transmitted. Means associated with the detector are provided to automatically re-enable the transmitter and initialize the counter when the switch is returned to a high pressure state. The pressure transducer is preferably at least partially metallic and may be conductively attached to the RF output so that the transducer functions as a transmitting antenna for the transmitter.

A battery may also be provided inside the body portion for powering the transmitter. The metallic portion of the battery may be attached to the RF output of the transmitter to also function as an antenna. Similarly, the RF output of the transmitter may also be conductively coupled to a metal wire valve stem, which can function as an antenna.

A seal may be provided in the bottom end of the body of isolating the transmitter from the pressure in a tire. A second seal in the top end of the body may be provided for isolating the transmitter from the atmosphere.

Means may also be provided for initializing the counter and re-enabling the transmitter in response to a power up condition. An insulator may be provided on the top of the battery, with an electrical conductor spaced from the battery by the insulator. A rotatable cap threaded into the top end of the body may be provided with means for pushing the conductor into electrical contact with the battery when the cap is threaded onto the body to turn the device on. Means may also be provided for limiting the angular rotation of the cap to movement only between a first predetermined position (for turning the device off) and a second predetermined position (for turning the device on).

Still another aspect of the present invention is a means for locking the device onto a valve stem to prevent unauthorized or accidental removal.

The tire pressure detector is also provided with a means for detecting a low battery condition and transmitting a coded pulse, different from the coded pulse transmitted in response to a low tire pressure condition, when a low battery condition is detected.

The tire pressure warning system of the present invention also includes a receiver for receiving and decoding signals transmitted by the transmitter in the detector. The receiver is separate from the monitoring device and can recognize and differentiate between the low battery signal and the low tire pressure signal transmitted by any particular detector. The transmitter is also provided with means for differentiating between different codes transmitted by different detectors, and can indicate to a vehicle operator which detector transmitted any particular code received. The receiver is also programmable by the operator to remember and recognize any desired code sequence transmitted by a detector that was not previously recognizable by the receiver.

Other objects, features, and advantages of the present invention will be apparent from the detailed description of the invention that follows and from the appended drawings.

BRIEF DESCRIPTION OF THE DRAWINGS

FIG. 1 is an exploded perspective view of a detector of the present invention.

FIG. 2 is a partial side view of the top of the detector, partially cut away.

FIG. 8a is a block diagram of the electronics of the transmitter.

FIG. 8b is a block diagram of the electronics of the receiver.

FIG. 9 is a waveform diagram of coded signals transmitted by the transmitter.

FIGS. 10a, 10b and 10c are partial waveform diagrams of three of the timing signals in the transmitter.

FIG. 10d is a waveform diagram of a tranmission sequence generated by the transmitter.

FIGS. 13a–13h are waveform diagrams of eight of the timing signals generated by the clock generator circuit and the encoder logic circuit.

FIGS. 14a–14d are waveform diagrams illustrating the timing relationships between four of the timing signals in the encoder logic circuit.

FIG. 15 is a detailed schematic of the battery monitor circuit.

FIG. 16 is a detailed schematic of the radio frequency transmitter circuit.

DETAILED DESCRIPTION OF THE PREFERRED EMBODIMENTS

Figure 3:
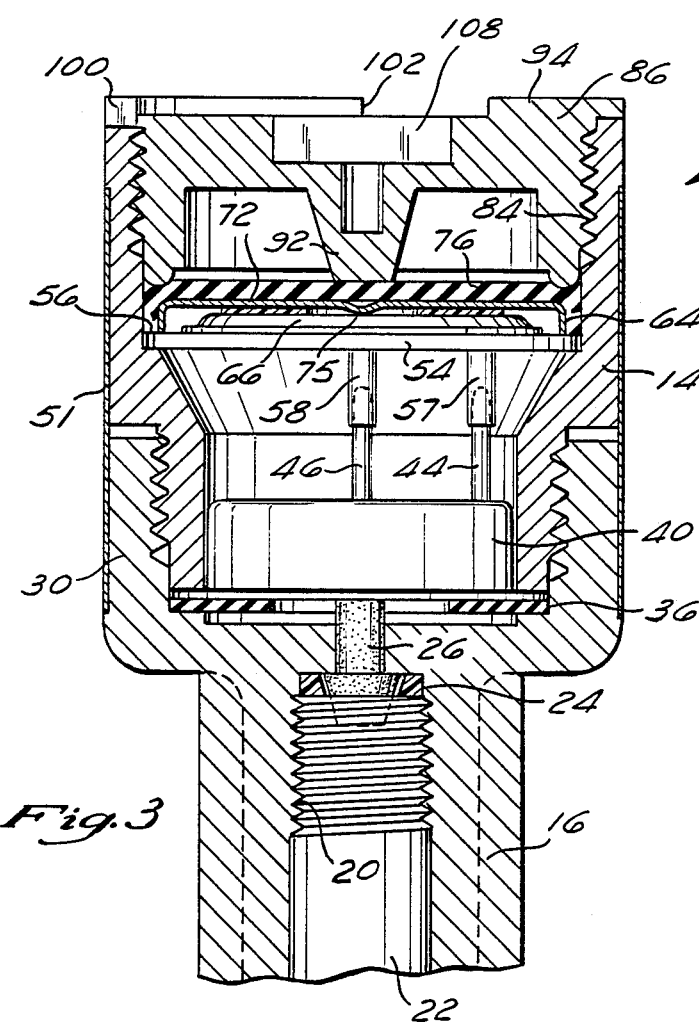
FIG. 3 is a side view of an axial cross section of the top of the detector.

The tire pressure warning system of the present invention includes at least one tire pressure detector mounted on the tire valve stem of a vehicle in fluid connection with the interior of a pneumatic tire. Inside the detector, preferably coaxially disposed in a cylindrical package, are a pressure transducer, a transmitter and associated electronics, a battery, and an on/off switch. The pressure transducer is in operative communication with the pressurized gas inside the tire, so that it can detect tire pressure.

In a preferred embodiment, the system includes a plurality of tire pressure detectors, each mounted on the valve stem of a separate tire on the vehicle. With large vehicles, 18 or more tire pressure detectors may be necessary.

The on/off switch of the tire pressure detector can be operated from the exterior of the device, preferably by rotating the cap on the detector housing. The components inside of the device are in a hermetically-sealed housing. The on/off switch can be actuated without disturbing that seal. In a preferred embodiment, even the switch contacts are isolated from the exterior of the device. Preferably, the switch contacts lie beneath a flexible gasket or seal which may be deformed to close the switch contacts, thereby supplying power to the device, without disturbing the seal.

A low tire pressure condition is sensed by the device of the present invention in response to a switch actuated by the pressure transducer. Means are also provided for determining whether a signal or change of state of the pressure switch is due to chatter and bounce (from road vibration) or to a low pressure condition. Means are provided in the detector for monitoring the state of the tire pressure switch. When the switch indicates underinflation (or low pressure) and the on/off switch is "on", a transmitter in the detector begins transmitting a predetermined coded signal. The coded signal is transmitted in the form of a signal burst, and the coded signal burst is repeated a predetermined number of times.

A counter in the detector keeps track of the number of coded signal bursts that have been transmitted, and disables the transmitter (thereby conserving the battery) when a predetermined number of signal bursts have been transmitted. The counter is initialized and the transmitter is re-enabled only in response to a return of the pressure-actuated switch to the high pressure state or in response to turning the power switch off, then on. This particular arrangement provides a number of advantages. The first is the conservation of battery life. The largest power drain that is placed on the battery of a device of this type is by the transmitter. Unbridled repetitive transmission by the transmitter can rapidly drain a small battery. The detector of the present invention avoids this problem by shutting down after a predetermined number of signals have been transmitted. Moreover, it stays in the "shut down" state until some action is taken by the vehicle operator to correct the condition.

The present invention is also designed to conserve the battery in the chain of distribution prior to purchase. While, ordinarily, the device would be turned "off" prior to sale, it is entirely possible and, indeed, probable, that at least some devices will be turned on (perhaps by prospective customers) before purchase. The automatic shut-down feature of the present invention conserves battery power even when the detector is inadvertently left "on" prior to sale.

The reset feature of the detector of the present invention also provides significant advantages in operation. When the tire is refilled, for example, after the detector has transmitted and has shut down, the detector is automatically re-enabled by the increased tire pressure and is ready to transmit a low pressure warning in the event of any subsequent pressure loss. This is true whether or not the vehicle operator remembers to turn the device off after a transmission has been received.

Testing of the detectors is also facilitated. Thus, any device that is removed from the tire will automatically transmit if it is turned on. However, the transmitter is automatically reset when the device is replaced on the valve stem of a properly-inflated tire.

Another aspect of the present invention is the low battery sensor feature. A low battery sensor is provided in the detector. When a low battery condition is detected, the transmitter transmits a coded pulse that is different from the "low tire pressure" code.

In addition, when a plurality of detectors are provided on a single vehicle, various detectors may have different codes. Thus, it is possible for a set of tires, or for each individual tire, to transmit a different code sequence.

The receiver used in connection with the present invention can be programmed to recognize and differentiate between the different coded signal bursts received from the transmitters. The receiver can then indicate to the vehicle operator whether the signal received indicates a lwo tire pressure or a low battery, and which tire or set of tires transmitted the signal.

The receiver also includes a latching feature, so that it will continue to display a warning to the vehicle operator after a transmission has been received until it is reset. This permits the operator to know that a signal has been received even if he was not in the vehicle at the time.

The present invention finds particular application in the trucking industry, both because of the expense of a truck tire and because of the large number of tires on a truck. However, a semi-tractor can be and is used to pull a number of different trailers. For example, an independent owner/operator may pull a different trailer with his own tractor for every trip. Of course, the codes transmitted by the tires on the trailer are likely to be different from the codes transmitted by the detectors on the tractor. Accordingly, the receiver of the present invention is programmable to recognize any desired detector code or any combination of detector codes.

Thus, when a driver receives a trailer to transport, the dispatcher can program the receiver to recognize the particular codes transmitted by the detectors on the trailer.

The particular embodiment of the invention shown in the drawings will now be described in detail.

With reference to FIGS. 1 and 2, the tire pressure detector 10 has a bottom piece 12 and a body piece 14. The bottom piece 12 and the body piece 14 may be made of any suitable material, such as plastic, ceramic, or metal. A high-impact organic polymer material is preferred. Suitable materials include polyethylene, polypropylene, polyvinylidine chloride, polystyrene, polyvinyl chloride, polytetrafluoroethylene, acrylonitrilebutadiene-styrene terpolymer, polyphenylene sulfide, polysiloxane, polyethylene terephthalate, polychlorotrifluorethylene, polyimides, melamine formaldehydes, polyphenylenes, polybenzimidazoles, nylons, and combinations thereof. Particularly preferred are polymers having good moisture and vapor barrier properties. The polymer resins may optionally be filled with suitable fibers, such as graphite fiber, glass fiber, carbon fiber, boron fiber, aramid fiber, and the like. The pressure detector parts may be molded or machined, as will be apparent to those of skill in the art.

The bottom piece 12 has a stem portion 16 of reduced diameter for attachment to a tire valve stem. The stem portion 16 is preferably provided with interior threads 20 so taht it can be threaded onto a valve stem 22. Alternatively, the stem portion may be attached to the valve stem 22 by any other suitable method, such as by a clamping action.

A valve stem seal 24 is provided inside the stem portion 16 of the bottom piece 12 to seal against the end of the valve stem 22 when the detector is tightened onto the valve stem.

The bottom piece 12 of the detector 10 is also provided with a valve depressor 26 for opening the valve in the valve stem 22. The valve depressor 26 is on the interior of the bottom piece 12 and is coaxial with the bottom piece 12 and the valve stem 22. The valve depressor 26, in a preferred embodiment, is made of porous material such as sintered polypropylene plastic, sintered brass, aluminum, or stainless steel, or metal foam. In this embodiment, the valve depressor serves as a filter for air from the tire. It also serves to smooth out sudden pressure fluctuations in the tire, such as those caused by vibration or by irregularities in the road surface. Alternatively, the valve depressor may be fluted or grooved or hollow to permit air flow through or past the valve depressor.

The bottom piece 12 has an open cup portion attached to the stem portion 16. The cup portion of the bottom piece 12 is generally cylindrical and has an open interior provided with interior threads 32. An opening coaxial with the valve stem portion 16, is provided between the open cup portion 30 and the interior of the stem portion 16 to permit fluid communication therebetween. The valve depressor 26 is, preferably, situated in that opening.

A gasket seat 34 is provided near the bottom of the cup portion. An annular pressure gasket 36 is placed on the gasket seat 34. The gasket 36 is preferably formed of tetrafluoroethylene, nylon, a rubber (such as neoprene or polybutadiene), or silicone.

A pressure transducer 40 is situated on top of the pressure gasket 36. The pressure transducer 40 has a circular lip 42 that seals against the pressure gasket 36. The pressure transducer 40 is preferably made of metal and is of conventional, commercially-available design. Suitable pressure transducers are sold commercially by Technar, Inc., as well as other manufacturers.

Unlike the switches in conventional tire pressure sensors, the pressure transducer 40 preferably includes a normally-open switch (instead of a normally-closed switch). This switch (not shown) is open when the transducer 40 is at atmospheric pressure. The switch closes when the transducer is exposed to a predetermined superatmospheric increased pressure. (It is perfectly acceptable, however, to use a switch that is closed when the transducer 40 is at atmospheric pressure and is open at the higher pressure. Unlike prior art devices, the transmitter and other circuitry is not connected to the battery through the pressure switch.) For automotive tires, for example, a suitable predetermined pressure would be 28 psi. Commercial truck tires, on the other hand, may require a pressure transducer having a switch closing at pressures above 45 psi.

The pressure transducer 40 has a first electrical contact 44 and a second electrical contact 46 extending upwardly from the transducer 40 when it is mounted in the cup portion 30. These electrical contacts 44 and 46 are connected to the switch in the pressure transducer 40.

The body piece 14 of the detector 10 is generally cylindrical. It is provided with outside threads 50 on the bottom thereof which match the inside threads 32 of the cup portion 30. When the body piece 14 is screwed into the cup portion 30 of the bottom piece 12, the bottom end 52 of the body piece 14 engages the circular lip 42 of the pressure transducer 40, forcing it against the cup gasket 36 and isolating the interior of the bottom piece 14 from pressurized air from the valve stem 22. For a permanent assembly, the bottom piece 12 and body piece 14 may be solvent welded, ultrasonically welded, or fastened together with an adhesive.

A tamper-resistant label 51 may be provided around the detector 10 to cover the seam between the bottom piece 12 and the body piece 14. The label, which may be made of an adhesive-coated foil, metallized plastic, or other suitable material, also serves as a secondary seal further to isolate the interior of the body piece 14 from the exterior and to prevent disassembly of the detector 10.

A circular printed circuit board 54 is mounted inside the body piece 14 on a lip 56. The printed circuit board 54 has two mating contacts 57, 58 which connect to the first and second electrical contacts 44 and 46 on the pressure transducer 40. The printed circuit board 54 contains electronics based on surface mount technology and integrated circuit technology. The circuitry will be explained in more detail below.

On the top side 60 of the printed circuit board 54, there is provided an electrically conductive pad 62. The pad 62 is made of any suitable conductive material, but is preferably copper, solder, gold, or other highly-conductive material. One or more metal springs may also be used.

The printed circuit board 54 is also provided with a conductive stirrup 64 on the top side 60 which passes generally over (but spaced apart from) the conductive pad 62.

A battery 66 is placed on the top side 60 of the printed circuit board 54 under the stirrup 64. One side of the battery 66 is in electrical contact with the conductive pad 62.

Any suitable battery may be used in the device of the present invention. Particularly preferred, however, is a circular, flat, three-volt lithium battery. Suitable lithium batteries include those given an industry designation number of 2016. Such lithium batteries have a shelf life of from 5 to 10 years and a service life, under minimal load conditions, approaching their shelf life.

The battery 66 has a top side 70 adjacent the stirrup 64. Between the battery and the stirrup is a battery insulator 72. The insulator 72 is made of any suitable dielectric material. Suitable materials include silicone and Mylar. Although various configurations are possible, the preferred insulator shape is annular. The insulator serves as a spacer between the electrically-conductive stirrup 64 and the top 70 of the battery 66. An adhesive may be used to secure the insulator 72 to the top 70 of the battery 66. The insulator 72 does not completely cover the top of the battery 66; rather, there is at least one exposed portion 74 on the top 70 of the battery 66 beneath the stirrup 64. Preferably, a detent 75 is formed in the stirrup over the exposed portion 74 to serve as an electrical contact. The side of the detent extending toward the exposed portion 74 of the battery 66 may be plated with gold or other conductive corrosion-resistant material. However, contact between the battery top 70 (which is of opposite polarity to the portion of the battery in contact with conductive pad 62) and the conductive stirrup 64 (and detent 75) is prevented by the insulator 72 unless force is applied to the portion of the stirrup 64 over the exposed portion 74 of the battery 66 to bias the detent 75 of the stirrup 64 into contact with the exposed portion 74.

A battery gasket 76 is provided on top of the battery 66 and stirrup 64. The battery gasket 76 is a flat disk having a recess on one side to receive the battery 66 and the stirrup 64. The edge 80 of the battery gasket can seal against the inside wall of body piece 14.

The battery gasket 76 is made of any suitable resilient material, such as rubber or silicone polymer. The battery gasket 76, in conjunction with the cup gasket 36, completely seal the battery 66 and the printed circuit board 54 inside the body piece 14, protecting them from dust, moisture, and corrosion.

The top end 82 of the body piece 14 is provided with interior body threads 84. An externally threaded cap 86 is threaded into the internal threads 84 in the top 82 of the body portion 14. The cap 86 has a sealing surface 90 at its bottom edge that contacts the battery gasket 76 when the cap is threaded onto the body portion to a first predetermined position. As shown in FIGS. 2 and 3, the interior of the cap 86 has an inwardly or downwardly-extending switch actuator 92. The switch actuator 92 extends from the center of the cap 86 axially downward from the cap to the battery gasket 76. When the cap 86 is screwed onto the body piece 14 to the first predetermined position, illustrated in FIG. 3, a seal is created between the cap sealing surface 90 and the battery gasket 76. The pressure of the sealing surface 90 against the top of the battery gasket 76 deforms the gasket 76 so that the edge 80 of the gasket 76 seals against the inside of the body piece 14. However, the switch actuator 92, although it may be touching the battery gasket 76, does not significantly deflect the battery gasket 76.

When the cap 86 is tightened down onto the body piece 14 beyond the first predetermined position to a second predetermined position, as shown in FIG. 2, the switch actuator 92 presses against the battery gasket 76, deflecting the battery gasket 76 against the conductive stirrup 64, which in turn makes electrical contact with the exposed portion 74 of the battery 66. This creates an electrical circuit, supplying power to the printed circuit board. It is important to note that the sealing surface 90 on the cap 86 continues to make sealing contact with the sides of the battery gasket 76 in the second predetermined position as in the first predetermined position.

Figure 4:
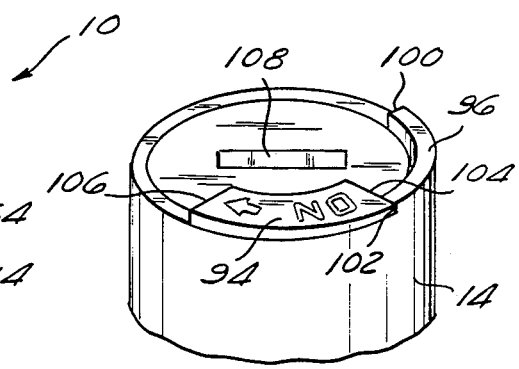
FIG. 4 is a perspective view of the top of the detector.
Figure 5:
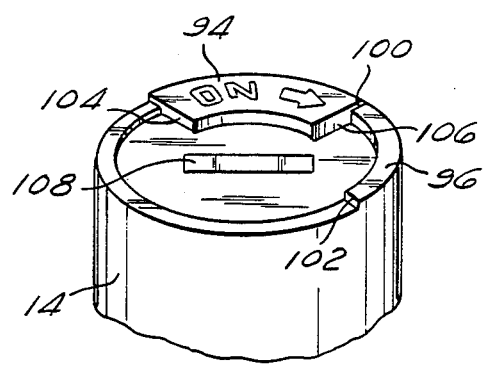
FIG. 5 is another perspective view of the top of the detector.

In order to facilitate the function of the cap 86 in serving as an on-off switch when rotated between the first and second predetermined positions, a tab 94 is provided on the top of the cap 86 projecting radially outward from the cap 86. See FIGS. 4 and 5. The top 82 of the body piece 14 is provided with a raised portion thereon having a first edge 100 and a second edge 102. The raised portion 96 and the edges 100 and 102 cooperate with the tab 94 on the cap 86 as follows: when the cap 86 is threaded onto the body piece 14 through clockwise rotation, shortly before reaching the first predetermined position, the tab 94 contacts the raised portion 96 of the top 82 of the body piece 14. As tightening continues, the tab 94 rides over the raised portion 96 until the cap 86 is tightened to the first predetermined position, as shown in FIG. 4. At that point, the first edge 104 of the tab 94 reaches the second edge 102 of the raised portion 96 and drops down past it to the top 82 of the body piece 14. If clockwise rotation continues, so that the cap 86 is rotated to the second predetermined position, the second edge 106 of the tab 94 makes contact with the first edge 100 of the raised portion 96, preventing further angular rotation of the cap 86 in that (clockwise) direction. The second predetermined position of the cap is shown in FIG. 5. Thus assembled, the tab 94 and the raised portion 96 cooperate to permit angular rotation of the cap 86 only between the first predetermined position and the second predetermined position.

In a preferred embodiment, the tab 94 and the raised portion 96 both comprehend approximately 90° of arc. Thus, in combination, the angular rotation between the first predetermined position and the second predetermined position is 180°. With threads of 0.050 pitch, the axial travel of the switch actuator 92 between the first predetermined position and the second predetermined position would be 0.025 inches. Of course, by making the tab 94 and the raised portion 96 much narrower, increased angular rotation (and axial travel of the switch actuator 92) is possible.

A coin or key slot 108 may be provided in the top of the cap to enable a user to more readily rotate the cap 86.

Figure 6:
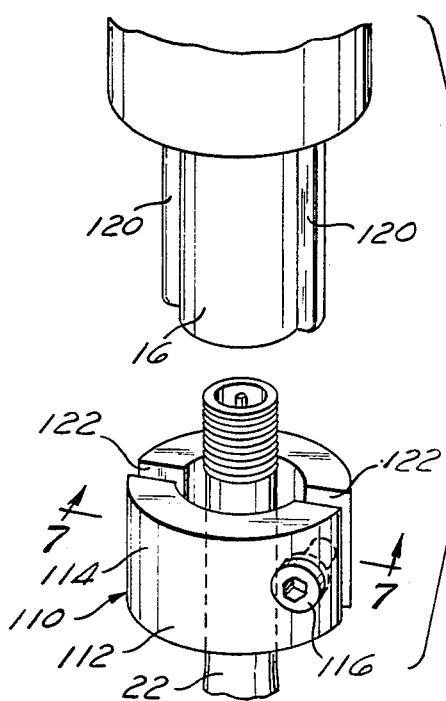
FIG. 6 is a partial side view of the bottom of the detector and a matching device for locking the detector onto the valve stem.
Figure 7:
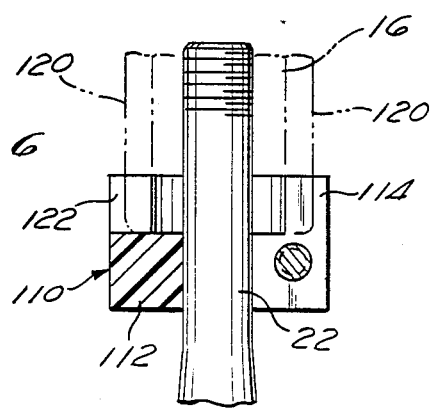
FIG. 7 is an axial cross section of the locking device taken along the line 7—7 in FIG. 6.

With reference now to FIGS. 6 and 7, means are provided for preventing unauthorized and accidental removal of the detectors 10 of the present invention from the valve stem 22. The function of the locking device is as follows.

An axially-split locking sleeve 110 is first placed on the valve stem 22. The lower sleeve portion 112 has an inside diameter approximating that of the valve stem 22. The upper portion 114 of the split sleeve 110 has an increased inside diameter larger than the outside diameter of the valve stem 22 and large enough to accommodate the stem portion 16 of the bottom piece 12 of the detector 10.

A set screw is provided in the split sleeve 116 extending from one side of the sleeve across the split portion and threaded into the other side of the sleeve, so that when the set screw 116 is tightened, the opposing sides of the locking sleeve 110 are pulled toward each other, thereby decreasing the inside diameter of the sleeve 110. The inside diameter of the lower portion 112 of the sleeve 110 is such that, when the set screw 116 is tightened, the sleeve 110 locks onto the valve stem 16.

The stem portion 16 of the detector 10 is provided with one or more axially extending irregularities 120 on the outside thereof. In the illustrated embodiment, the irregularities 120 are fins extending outwardly from the cylindrical stem portion 16 of the detector 10. The irregularities 120 could just as well be slots, grooves, ridges, or any other deviation from a cylindrical shape.

Mating portions 122 are provided in the upper portion 114 of the sleeve 110, corresponding to the axially-extending irregularities 120. Thus, when the irregularities 120 are fins, the mating portions 122 are slots for receiving those fins.

In use, the locking sleeve 110 is placed over the valve stem, after which the stem portion 16 of the detector 10 is threaded onto the valve stem 22 until it is tight. Then, with the set screw 116 loosened, the locking sleeve 110 is slid up onto and over the stem portion 16 with the irregularities 120 fitting into the mating portions 122. The set screw 116 is then tightened, which tightens the inside of the lower portion 112 of the locking sleeve 110 against the valve stem 22, locking the sleeve 110 to the valve stem 22. With the irregularities 120 of the detector 10 in the mating portions 122 of the locking sleeve 110, the detector 10 cannot be rotated to unscrew it from the valve stem 22 until the set screw 116 is loosened. It is not necessary that there be tight fit between the irregularities 120 and the mating portions 122, nor between the inside of the upper portion 114 of the locking sleeve 110 and the stem portion 16 of the detector 10. Even if the fit is not a close one, rotation of the detector 10 to remove it from the valve stem 22 is prevented by the interference between the irregularities 120 and the mating portion 122.

In order to prevent unauthorized removal of the locking sleeve 110 and the detector 10, the head of the set screw 116 may be of somewhat unconventional design, so that it may be turned only with a specialized tool. Such specialized tools include torx drivers, special keys, Allen wrenches or similar devices having more or less than six sides.

The locking sleeve may be made of any tough, durable material, and may be made of the same material a the tire pressure detector 10. If the locking sleeve 110 is made of metal, a non-metallic insert to line the interior of the sleeve 110 is preferred, in order to prevent galvanic corrosion between the locking sleeve 110 and the metal valve stem 22.

FIGS. 8a and 8b illustrate block diagrams of exemplary embodiments of a transmitter circuit 196 and a receiver circuit 198, respectively. The transmitter circuit 196, illustrated in FIG. 8a, includes the pressure switch 40, described above, which is provided an as input to a clock generator circuit 200. In the embodiment illustrated, the clock generator circuit 200 has nine outputs: RESET, Q1, Q2, Q4, Q5, Q6, Q10, Q12 and Q18, on lines 202, 204, 206, 210, 212, 214, 216, 220, and 222, respectively. The signals on the lines 202, 204, 206, 210, 212, 214, 216, 220 and 222 are provided as inputs to an encoder logic circuit 230. The encoder logic circuit has an output on a line 254 which is connected to the input of a radio frequency transmitter 260. Switching of the switch 40 from its normally closed position to its open position causes the clock generator circuit 200 to generate a sequence of timing signals on the lines 202–222 and thus, cause a signal to be transmitted by the radio frequency transmitter 260, as will be explained in detail below. The encoder logic circuit 230 determines the characteristics of the signal so generated.

The battery 66 provides a DC supply voltage +V to the transmitter circuit 196 when the switch 64 is closed. The switch 64 corresponds to the stirrup 64 in FIGS. 2 and 3.

A battery monitor circuit 240 is also preferably provided. The battery monitor circuit 240 is electrically connected to the encoder logic circuit 230. As will be set forth in detail below, the function of the battery monitor circuit 240 is to monitor the DC supply voltage provided by the battery 66 and generate an output signal on a line 242, which is active when the voltage on the battery 66 drops below a predetermined minimum magnitude. In the preferred embodiment, the output of the battery monitor circuit 240 on the line 242 is provided as an input to the encoder logic circuit 230. The power for the battery monitor circuit 240 is not provided directly by the battery 66, but is instead provided by an output of the encoder logic circuit 230 on a line 244. The voltage on the line 244 is substantially the same as the voltage provided by the battery 66. Thus, the battery monitor circuit 240 is only supplied with power when the encoder logic circuit 230 provides an active output on the line 244, and does not impose a continuous drain on the battery 66. In other embodiments, the battery monitor circuit 240 can be powered directly by the battery 66. If the battery monitor circuit 240 is powered directly by the battery 66, it can continuously monitor the voltage on the battery 66 and generate a signal on an optional line 246 (shown in dashed lines) when the voltage drops below the predetermined magnitude. An active signal on the line 246 can advantageously initiate a transmission sequence.

Also provided is a code select circuit 250. As will be explained below, the code select circuit allows the transmitter circuit 196 to transmit a selected identification code that can be distinguished from other transmitters transmitting a different code. The output of the code select circuit is provided to the encoder logic circuit 230 via a set of lines represented by the designator 252.

The output of the encoder logic circuit 230 is a transmitter enable signal on a line 254. FIGS. 9 and 10d illustrate the signal on the line 254 in the preferred embodiment. As shown in FIG. 9, the signal on the line 254 comprises a digital data stream having pulses of alternating high and low voltages. In the preferred embodiment, the data comprises six start signals each having a duration of approximately 167 microseconds and each having a duty cycle of approximately 50%. The start signals are used as synchronization signals for the receiver circuit 196. Following the six start signals are two battery condition signals each having a duration of approximately 167 microseconds and each having a duty cycle of either 25% or 75%, depending upon the condition of the battery. In the preferred embodiment, the duty cycle of both battery condition signals are the same. If the battery voltage is below the predetermined magnitude, both signals have a 25% duty cycle. Otherwise, the battery condition pulses have a 75% duty cycle. The two battery condition signals are followed by eight identification signals which either have a 75% duty cycle representing a logical "1" data bit or a 25% duty cycle representing a logical "0" data bit. Each of the eight identification signals are independently selectable according to the code select circuit 250 in FIG. 8b. One skilled in the art will recognize that the eight identification signals provide 256 unique identification codes. A larger number of identification codes can be provided by increasing the number of identification signals. The six start signals, the two battery condition signals and the eight identification signals comprise a frame of data having a duration of approximately 2.67 milliseconds.

As illustrated in FIG. 10d, eight frames of data are transmitted sequentially for a time duration of approximately 21.36 milliseconds. Thereafter, no signal is transmitted for approximately 21.36 milliseconds, a quiescent period having a duration equivalent to the duration of the eight frames, and then an additional eight frames of data are generated. In the preferred embodiment, all the frames of data have identical information unless the voltage of the battery changes and thereby causes the duty cycle of the battery condition signals to change during the transmission. The second set of eight frames is followed by a quiescent period of no transmission which is greater than 10 seconds in order to comply with §15.122(b) of Part 15 of the Rules and Regulations of the Federal Communications Commission. Approximately 10.7 seconds after the start of the transmission of the first two sets of eight data frames a second two sets of eight data frames are transmitted. Succeeding pairs of sets of eight data frames are transmitted at approximately 10.7 second intervals until 64 pairs of sets of eight data frames are transmitted. Thus, the total duration of the spaced transmissions is approximately 11.25 minutes which increases the probabilities that the operator of the vehicle will be present in the vehicle when the transmissions occur. The transmitter then becomes quiescent until either reset by turning the power off and on or until the tire to which the device is attached is filled above the predetermined minimum pressure and the device is reattached. In the former case the device will again generate a transmission sequence if the pressure is still below the predetermined minimum. In the second case, the device will be in the logical condition to monitor the state of the pressure switch and to transmit when the pressure drops below the predetermined minimum.

Returning again to FIG. 8a, the output of the encoder logic circuit on the line 254 is provided as an input to the radio frequency transmitter 260. The radio frequency transmitter 260 is normally inactive except when the encoder logic circuit 230 activates the signal on the line 254. At that time, the radio frequency transmitter 260 generates a radio frequency signal on a line 262 to an antenna 264. Although illustrated as a separate part, the antenna 264 is preferably the metallic portions of the valve stem 22 (FIGS. 3, 6 and 7) or the metallic casings of the battery 66, or the transducer 40, to which the device of the present invention is attached. The output of the radio frequency transmitter 260 is capacitively coupled to these metallic parts. When the radio frequency transmitter 260 is activated, a radio frequency signal (represented pictorially as 266) is radiated by the antenna 264. Typically, the frequency of the signal generated by the radio frequency transmitter 260 is in the 260 to 470 MHz band, for example, 390 MHz. Other frequencies could be advantageously used so long as their use complies with the Rules and Regulations of the Federal Communications Commission.

FIG. 8b illustrates an exemplary block diagram of a receiver 198 used to receive the radio frequency signals generated by the radio frequency transmitter 266 illustrated in FIG. 8a. An antenna 300 senses the radio frequency energy 266 generated by the radio frequency transmitter 260 and conducts the energy to a radio frequency receiver 304 via an electrical interconnection 306. The receiver 304 is of conventional design and generates an output signal on a line 308 which generally corresponds to the input signal to the radio frequency transmitter 260 on the line 254 in FIG. 8a. The output of the radio frequency receiver 304 on the line 308 is provided as an input to a preprocessor 310. The preprocessor 310 may be of conventional design and conditions the signal from the radio frequency receiver 304. The preprocessor 310 also detects the beginning of each frame when it receives the six start bits having the 50% duty cycles and is thereby synchronized with each frame. The preprocessor 310 also determines whether the two battery condition bits and the eight identification bits are ones or zeroes by measuring their duty cycles. The outputs of the preprocessor 310 on lines 312 and 314 are provided to a microprocessor 320 as a series of start bits and data bits. The microprocessor is programmed to verify that the data signals in each frame correspond to the transmission sequence described above in connection with FIGS. 9 and 10d. Since the transmitter circuit 196 operates in an environment which is not ideally suited to transmission of a low power radio frequency signal, it is expected that not all of the signals generated by the radio frequency transmitter 260 will be correctly received by the radio frequency receiver 304 and provided to the microprocessor 320 via the preprocessor 310. Thus, the microprocessor 320 is advantageously programmed to analyze the received signals and determine whether a majority of the frames in an eight-frame set have the correct number of start signals (e.g., six) and have an identification code corresponding to a code to which the microprocessor 320 is programmed to respond.

In the preferred embodiment, the microprocessor 320 is programmed to respond to one or more selected codes. If the received signal corresponds to one of the selected codes, the microprocessor 320 generates one or more signals on lines 322, 324, 326, 328 to a display 340. The display 340 has a plurality of indicators 342, 344, 346, 348 on a front panel 350 which are selectively activated to indicate the source of the transmitted signal. The indicator 342 is preferably an audible indicator which is intended to draw the vehicle operator's attention to the visual display. In one particularly preferred embodiment, the audible signal is a synthesized voice which enunciates the words "FLAT TIRE" or other words of similar significance. In other embodiments, the audible signal is a tone. In one embodiment, the indicator 344 on the display designates a flat tire on the tractor, and a separate indicator 346 designates a flat tire on the trailer. Preferably, the indicator 348 on the display 340 designates a low battery condition. In an especially preferred embodiment, the display 340 has a numeric indicator (not shown) to indicate the received code. Thus, if each tire has a uniquely coded transmitter, the operator can determine which tire is flat by comparing the displayed code with a list of codes for each tire.

The display 340 also has a reset button 352 which generates a signal on a line 354 to the microprocessor 320 to indicate that the operator has acknowledged the display indication. In response to the reset signal on the line 352, the microprocessor 320 clears the display indicators on the display 340. Otherwise, the display indicators remain active. Thus, although the operator may not be in the vehicle when the audible signal is active, the visual signals will remain active until reset.

The display 340 also preferably includes three input connectors 360, 362 and 364 which provide a means of programming the microprocessor 320 to respond to selectable identification codes. In the preferred embodiment the input connector 360 (shown in dashed lines) has eight pairs of inteconnection pins (not shown). The two pins in each pair can be selectively interconnected to provide the identification code for the transmitters on the wheels of the tractor. Since the transmitters on the tractor are not likely to change unless the receiver circuit 198 is tranferred from one tractor to another, a series of eight switches are provided to provide the selective interconnections. Preferably, the eight pairs of interconnection pins are arranged in a standard pattern corresponding to a 16-pin dual in-line package (DIP) and the interconnections are provided by a 7000 Series or 7100 Series DIP switch which is commercially available from AMP Special Industries, or the like. Preferably one pin of each pair of pins is connected to a signal ground reference and the other pin of each pair is provided as an input to the microprocessor 320. The input pin of each pair is advantageously pulled up to a high voltage level by a pull-up resistor (not shown). When the switch interconnecting the input pin to the grounded pin is closed, the input pin changes to a low voltage level input. Thus, the eight interconnection pins can be selectively connected to select one of the 256 identification codes thereby provided. The eight input lines are shown collectively as the lines 364 in FIG. 8b. Since the code for a tractor is not likely to be changed very often, the connector 360 can be installed directly on the printed circuit board (not shown) of the display unit and is not required to be readily accessible by the operator.

The connector 362 can be substantially the same as the connector 360, and is used to select the code for the trailer currently attached to the tractor. Since the trailer identification code typically needs to be changed more frequently than the tractor code, the connector 362 is preferably positioned behind a sliding panel (not shown) on the front panel 350 of the display 340 so that it can be readily accessible to the operator, yet protected from inadvertent changes in the switch positions. The eight lines connecting the connector 362 to the microprocessor 320 are represented by the identifier 368.

The connector 364 preferably is a 10-pin strip connector. In a particularly preferred embodiment, the connector 364 is configured as an input port to the microprocessor 320. Eight of the 10-pins (not shown) of the connector 364 are electrically connected to the eight input pins of the connector 362 and thus to the lines 368. The other two pins of the connector 364 provide an input request signal on a line 370 to the microprocessor 320 and an acknowledge signal on a line 372 from the microprocessor 320. In operation, the switches on the connector 362 are all opened so that they so not affect the data input to the computer 320. The eight input pins of the connector 364 are selectively opened or closed to represent a selected input code. A signal is generated on the request line 370 to the microprocessor 320. The microprocessor 320 will input the data from the eight input lines 368 and will generate a signal on the acknowledge line 372. Further identification codes can be sequentially input to the microprocessor 320 in the same manner. Preferably, the connector 364 is also positioned behind the selecting panel (not shown) for ready access for programming.

A keyboard (not shown) or an active terminal (not shown) can be connected to the connector 362 so that the microprocessor 320 can be dynamically programmed with the identification code of the transmitters connected to the tires of the trailer. This is particularly advantageous in operations where the tractor is frequently connected to a variety of trailers belonging to different companies. When a tractor operator is assigned a new trailer, the operator can program the identification code or codes of the transmitter on the trailer into the microprocessor 320. Preferably, the microprocessor 320 has a small amount of random access read/write memory (RAM) with a separate battery backup or an electrically alterable programmable read only memory (EAPROM) to maintain the trailer identification codes in the event of a power glitch in the tractor electrical system.

Figure 12:
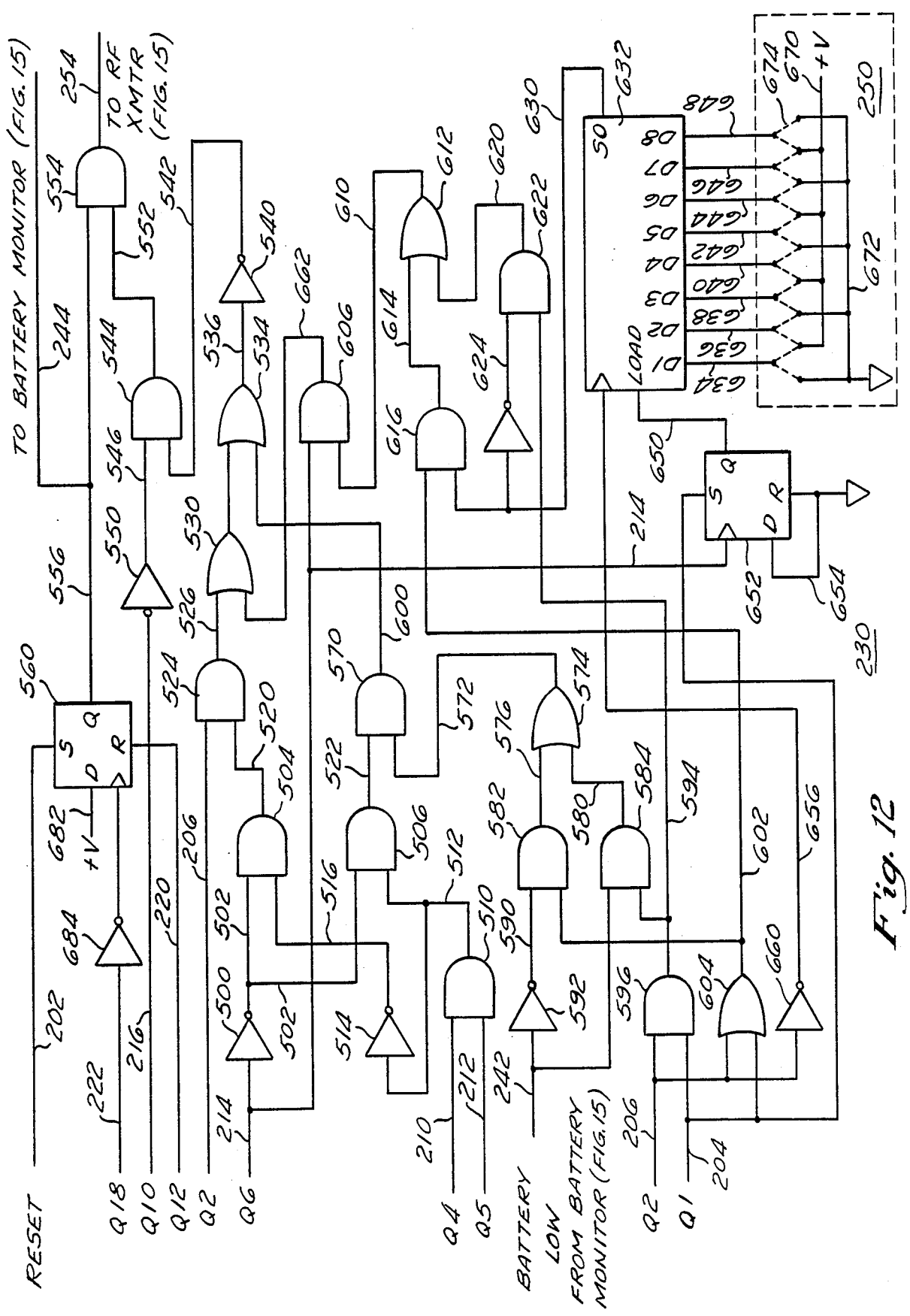
FIG. 12 is a detailed logic diagram of the encoder logic circuit in the transmitter.

FIG. 12 illustrates a preferred embodiment of the clock generator circuit 200. As previously shown in FIG. 8b, the switch 40 is connected between a ground reference, illustrated by the symbol 400 and the clock generator circuit 200. The normally closed contact of the switch 40 is connected via a line 402 to a first lead of a resistor 404. A second lead of the resistor 404 is connected via a line 406 to a first lead of a resistor 410 and a first lead of a capacitor 412. A second lead of the resistor 410 is connected to the positive voltage provided by the battery 66 (not shown). A second lead of the capacitor 412 is connected to the ground reference 400. The line 406 is also connected to the input of an inverter 414 and to an input to an AND-gate 416. One skilled in the art will recognize that the circuit comprising the resistor 404, the resistor 410, and the capacitor 412 is a filter circuit which prevents the signal on the line 406 from changing if the switch 40 is intermittently opened as a result of vibration or shock caused by travel on rough roads or other environmental factors. In the preferred embodiment, the resistor 404 may have a resistance of 10 Kilohms, the resistor 410 may have a resistance of 10 Megohms, and the capacitor 412 may have a capacitance of 200 picofarads. If the switch 40 remains open long enough to allow the capacitor 412 to charge from its initial zero voltage state towards the positive battery voltage (+V), the voltage on the line 406 will reach a magnitude greater than the thresholds of the inverter 414 and the AND-gate 416. The output of the inverter 414 on the line 202 is the RESET signal which is normally high when the switch 40 is closed. When the threshold of the inverter 414 is reached, the voltage on the line 202 switches to a low voltage substantially equal to the ground reference. This is illustrated in FIG. 13a. The line 202 is connected to the reset input of a 25-state binary counter 422. When the voltage on the line 202 is in the normally high voltage condition, the stages of the binary counter 422 are reset to their low or inactive conditions. When the RESET signal on the line 202 becomes low when the switch 40 is open, the binary counter 422 is enabled to count when a signal is received on its clock input connected to a line 424.

The clock signal on the line 424 is generated by an inverter 426 which is part of an oscillator circuit also comprising a NAND-gate 430, resistor 432, resistor 434, and capacitor 436. One input to the NAND-gate 430 is provided on a line 440 connected to the output of the AND-gate 416. A second input to the NAND-gate 430 is provided on a line 442 connected to one lead of the resistor 434. A second lead of the resistor 434 is connected to a line 444 which is also connected to a first lead of the resistor 432 and a first lead of the capacitor 436. A second lead of the capacitor 436 is connected to the clock line 424. A second lead of the resistor 432 is connected to a line 446 which is also connected to the output of the NAND-gate 430 and the input to the inverter 426. One skilled in the art will recognize that when the switch 40 is closed, the low signal on the line 406 causes the output of the AND-gate 416 on the line 440 to be low. Thus, the output of the NAND-gate 430 on the line 446 is forced high. Since the input to the inverter 426 is high, the output of the inverter 426 on the line 424 is low. This causes the capacitor 436 to charge through the resistor 432 so that a voltage substantially equal to the battery voltage is present across the capacitor 436 between the lines 444 and 424. The battery voltage will also be present on the input to the NAND-gate 430 via the line 442 and the resistor 434. A second input to the AND-gate 416 is connected via a line 450 to the output of an inverter 452. The input to the inverter 452 is provided on a line 454 which is connected to the twenty-fifth stage output (Q25) of the counter 422. Since the counter 422 is reset when the switch 40 is closed, the line 454 will be normally inactive low. Thus, the output of the inverter 452 on the line 450 to the input to the AND-gate 416 will be high. When the switch 40 switches to its open condition, both inputs of the AND-gate 416 will be high, thus causing the output of the AND-gate 416 on the line 440 to become high. Thus, both inputs to the NAND-gate 430 will be high causing the output on the line 446 to become low, and causing the output of the inverter 426 on the line 424 to become high. Since the voltage across the capacitor 436 cannot change instantaneously, the voltage on the line 444 will initially increase to approximately twice the battery voltage level. However, since the voltage on the line 446 is now a low voltage, the capacitor will begin discharging through the resistor 432 towards the ground level. When the voltage on the line 444 reaches the threshold of the NAND-gate 430, the output of the NAND-gate 430 on the line 446 switches from a low condition to a high condition, causing the output of the inverter 426 on the line 424 to switch from the high condition to the low condition. The capacitor 436 will then begin charging in the opposite direction. One skilled in the art can readily see that the NAND-gate 430, the inverter 426, the capacitor 436, the resistor 432, and the resistor 434, comprise an astable multivibrator which will oscillate so long as the voltage on the line 440 is high, enabling the NAND-gate 430. Thus, the multivibrator will oscillate until either the switch 40 is closed or the Q25 output of the counter 422 on the line 454 becomes high. The magnitudes of the capacitor 436, the resistor 432 and the resistor 434 are advantageously selected to control the frequency of oscillation on the line 424 at approximately 24,000 hertz. In the preferred embodiment, the capacitor 436 is a 200 picofarad capacitor, the resistor 432 is approximately 68,000 ohms, and the resistor 434 is approximately 270,000 ohms. The clock signal is illustrated in FIG. 13b.

As set forth above, the clock signal on the line 424 is provided as the clock input to the binary counter 422. The first stage output Q1 of the binary counter 422 divides the 24,000 hertz clock signal by 2, thus providing a 12,000 hertz output signal on the line 204, as illustrated in FIG. 13c. The second stage output Q2 divides the 12,000 hertz signal by 2 and provides a 6,000 hertz signal on the line 206, as illustrated in FIG. 13d. The third stage of the binary counter divides the 6,000 hertz signal by 2 to provide an internal 3,000 hertz signal, which is not provided as an output. The fourth stage output Q4 divides the 3,000 hertz signal and provides a 1,500 hertz output on the line 210, as illustrated in FIG. 13e. Similarly, the fifth stage output Q5 and the sixth stage output Q6 provide a 750 hertz signal on the line 212 and a 375 hertz signal on the line 214, as illustrated in FIG. 13f. Stages 7, 8 and 9 further divide the signal. The tenth stage output Q10 divides an output signal at 1/16 the frequency of the sixth stage or approximately 23.4 hertz, on the line 216, as illustrated for the first half cycle in FIG. 13g. The twelfth stage output Q12 has a signal frequency on the line 220 which is $\frac{1}{4}$ the signal frequency on the line 216, or approximately 5.85 hertz. The eighteenth stage output Q18 on the line 222 has a frequency which is 1/64 of the twelfth stage output, or approximately 0.093 hertz. The relationships between the Q10, Q12 and Q18 signals are partially shown in FIGS. 10a, 10b and 10c. Because of the scale of the drawings, the full timing relationships cannot be shown; however, one skilled in the art will readily recognize the binary relationships between the signals. The twenty-fifth stage output Q25 on the line 454 has a frequency 1/128 of the eighteenth stage output, or approximately 0.00073 hertz. Thus, the period of the twenty-fifth stage output on the line 454 is approximately 1370 seconds. Since the rising edge of the Q25 signal on the line 454 at approximately 685 seconds into the cycle, causes the AND-gate 416 to be disabled, the clock signal on the line 424 stops after approximately 685 seconds, or approximately 11.25 minutes.

In an alternative embodiment, not shown, the clock generator circuit 200 can be advantageously provided with a power on reset circuit which causes the RESET line 202 to be active for a short amount of time after power is applied to assure that the outputs of the counter 422 are reset. Thus, the full transmission sequence will occur even if the switch 40 is open when the power is applied. The power on reset circuit can be a conventional resistor/capacitor circuit.

FIG. 12 illustrates the detailed interconnections between the logic circuitry in the encoder logic circuit 230. The primary timing for the encoder logic circuit 230 is provided by the RESET, Q1, Q2, Q4, Q5, Q6, Q10, Q12, and Q18 signals from the clock generator circuit 200 on the lines 202, 204, 206, 210, 212, 214, 216, 220 and 222, respectively. During the first portion of each frame, the Q6 signal on the line 214 is low. The Q6 signal on the line 214 is provided as an input to an inverter 500 which has an output on a line 502. The line 502 is provided as an input to an AND-gate 504 and as an input to an AND-gate 506. The signals Q4 and Q5 on the lines 210 and 212 respectively are provided as the two inputs to an AND-gate 510. The output of the AND-gate 510 on a line 512 is provided as an input to an inverter 514 and as a second input to the AND-gate 506. The output of the inverter 514 on a line 516 is provided as a second input to the AND-gate 504. The AND-gate 504 has an output on a line 520 which is active when Q6 is low and when Q4 and Q5 are not both active high. The AND-gate 506 has an output on a line 520 which is active when Q6 is low and when Q4 and Q5 are both active high.

Referring again to FIGS. 13a-13g, which are timing diagrams for the outputs Q1, Q2, Q4, Q5 and part of Q6, one can readily see that the output of the NAND-gate 504 on the line 520 will be active during the first portion of each cycle until Q4 and Q5 are both concurrently active high. This corresponds to six cycles of the signal Q2. The line 520 is provided as one input to an AND-gate 524. A second input to the AND-gate 524 is the signal Q2 on the line 206. Thus, the output of the AND-gate 524 on a line 526 will comprise six pulses corresponding to the active high portions of the signal Q2 during the first six Q2 cycles. The signal on the line 526 is provided as one input to an OR-gate 530 which has an output 532 which is connected to one input of an OR-gate 534. The output of the OR-gate on a line 536 is provided as an input to an inverter 540. The second inputs of the OR-gates 530, 534 are both inactive during the first six Q2 cycles. Thus, the signal on the line 536 corresponds to the signal on the line 526. The inverter 540 has an output on a line 542 which corresponds to the inverted Q2 signal during the first six Q2 cycles. The line 542 is provided as one input to an AND-gate 544. The other input to the AND-gate 544 on a line 546 is the output of an inverter 550. The input to the inverter 550 is the signal Q10 on the line 216. Since the signal Q10 is inactive immediately following the reset signal and remains inactive for 512 clock cycles, the output of the inverter 550 on the line 546 will be active high. Thus, the signal on the line 542 is enabled through the AND-gate 544 to the output of the AND-gate 544 on a line 552. The line 552 is connected to one input of an AND-gate 554. A second input to the AND-gate 554 is a line 556 which is connected to the output of a flip-flop 560. The output of the flip-flop 560 is initially set to an active high level by the reset signal on the line 202, and will remain set until an active signal Q12 on the line 220 connected to the reset of the flip-flop 560. Thus, the signal on the line 552 will be enabled through the AND-gate 554 to the output of the AND-gate 554 on a line 562. One skilled in the art will readily recognize that the signals on the line 562 during the first six Q2 cycles following the reset correspond to the six start signals in the FIG. 9.

Returning again to the AND-gates 504, 506 and 510, the signals Q4 and Q5 will become concurrently high after six Q2 cycles. Thus, the output of the AND-gate 510 will become active high, and the output of the inverter 514 will become inactive low. Thus, the AND-gate 504 will be disabled and the AND-gate 506 will be enabled. The active signal output of the AND-gate 506 on the line 522 is provided as an input to an AND-gate 570. A second input to the AND-gate 570 is provided on a line 572 which is the output of an OR-gate 574. The OR-gate 574 has an input on a line 576 and an input on a line 580. The line 576 is connected to the output of an AND-gate 582, and the line 580 is connected to the output of an AND-gate 584. One input of the AND-gate 584 is connected to a low battery signal on a line 242 which is active low when the battery voltage is low. One input of the AND-gate 582 is connected a line 590 which is connected to an inverter 592. The input to the inverter 592 is the low battery signal on the line 242. Thus, the voltage level on the line 242 will determine whether then AND-gate 582 or the AND-gate 584 can be enabled. If the low battery signal on the line 586 is high, indicating that the battery voltage is sufficiently high, the AND-gate 584 will be enabled when the signal on a second input connected to a line 594 is high. The line 594 is connected to the output of an AND-gate 596 which has as inputs the signals Q1 on the line 204 and Q2 on the line 206. Thus, the signal on the line 594 will be active high when Q1 and Q2 are both high. This is more clearly illustrated in FIGS. 14a, 14b and 14c. Q1 and Q2 are both high during the last 25% of the Q2 cycle. Thus, when the low battery signal is high, corresponding to a battery voltage higher than the predetermined magnitude, a pulse having a duty cycle of approximately 25% will be generated on the output of the NAND-gate 584. This signal will propagate through the OR-gate 574 to the output of the AND-gate 570 on a line 600. It will then propagate through the OR-gate 534 to the output of the inverter 540 on the line 542. At that point, the signal will be the inverse of the signal shown in FIG. 14c, thus switching from a 25% duty cycle to a 75% positive duty cycle. This signal will propagate through the AND-gate 544 and the AND-gate 554 to provide a signal on the line 562 which corresponds to the battery condition signals illustrated in FIG. 9. Thus, when the battery condition is high, a signal having a 75% duty cycle would be generated on the line 562.

Returning again to the AND-gate 582, a second input to the AND-gate is connected to a line 602 which is connected to the output of an OR-gate 604. The inputs to the OR-gate 604 are the signals Q1 and Q2 on the lines 204 and 206, respectively. The output of the OR-gate 604 on the line 602 will be active when either Q1 or Q2 is active. Thus, the signal on the output of the OR-gate 604 on the line 602 will correspond to the signal illustrated in FIG. 14d. When the battery condition is low, the signal on the line 242 will be low causing the signal on the line 590 to be active high. Thus, the signal on the line 602 will propagate through the AND-gate 582, the OR-gate 574, the AND-gate 570, the OR-gate 534 and the inverter 540 to provide a signal on the line 542 which is the inverse of the signal shown in FIG. 14d, (i.e., it will have a 25% positive duty cycle). This signal will propagate through the AND-gate 544 and the AND-gate 554 to the line 562 to provide a signal corresponding to a battery condition signal having a 25% duty cycle, as illustrated in FIG. 9.

When the signal Q6 on the line 214 becomes active high, the output of the inverter 500 on the line 502 becomes inactive low, thus disabling the AND-gates 504 and 506. The AND-gates 524 and 570 are also disabled. At the same time, an AND-gate 606 has one input enabled. A second input to the AND-gate 606 on a line 610 is connected to the output of an OR-gate 612. One input to the OR-gate 612 is a line 614 which is connected to the output of an AND-gate 616. The second output to the OR-gate 612 is a line 620 which is connected to the output of an AND-gate 622. One input to the AND-gate 616 is connected to the line 602 which is the 75% duty cycle signal generated by the occurrence of either the signal Q1 on the line 204 or the signal Q2 on the line 206. Similarly, one input of the AND-gate 622 is connected to the line 594 which has the 25% duty cycle signal generated by the concurrence of the signals Q1 and Q2.

A second input to the AND-gate 622 is connected to a line 624 which is connected to the output of an inverter 626. The input to the inverter 626 is connected to a line 630 which is also connected to the input to the AND-gate 616. The line 630 is connected to the serial output of an eight-stage serial shift register 632. The logic level of the signal on the line 630 will determine whether the 75% duty cycle signal on the line 602 is enabled through the AND-gate 616 or whether the 25% duty cycle signal on the line 594 is enabled through the AND-gate 622. When the signal on the line 630 is active high, the 75% duty cycle signal is enabled through the line 616. Similarly, when the signal on the line 630 is inactive low, the 25% duty cycle signal on the line 594 is enabled through the AND-gate 622.

The shift register 632 is loaded with the data on its inputs D1, D2, D3, D4, D5, D6, D7, D8 on the lines 634, 636, 638, 640, 642, 644, 646, 648, respectively, on the high to low transition of a LOAD signal on a line 650. The LOAD signal on the line 650 is provided by the output of a flip-flop 652. The flip-flop 652 has a clock input which is connected to the signal Q6 on the line 214, and a data input which is connected to a signal ground reference via a line 654. Thus, when the signal Q6 switches from its low to its high level, the zero input on the line 654 is propagated to the output of the flip-flop 652 on the line 650, causing the data inputs to the shift register 632 to be loaded into the shift register. The set input to the flip-flop 652 is connected to the Q1 signal on the line 204. Thus, the LOAD signal on the line 650 remains low only until the next active signal on the line 204. This is illustrated in FIG. 13h.

The shift register 632 has a clock input which is connected to a line 656. The line 656 is connected to the output of an inverter 660 which has its input connected to the Q2 signal on the line 206. The shift register 632 will shift the data between its stages on the low to high transitions of the clock signal on the line 656. Thus, since the signal on the line 656 is the inverted Q2 signal, the data will be shifted each time Q2 makes a high to low transition. Therefore, the serial output signal of the shift register 632 on the line 630 will have a cycle corresponding to a Q2 cycle.

Returning again to the AND-gate 622, when the output of the shift register 632 is low on the line 630, the inverter 626 causes the signal on the line 624 to be active high. Thus, the 25% duty cycle signal is propagated through the AND-gate 622 to the line 620, and then through the OR-gate 612 to the line 610 to the input of the AND-gate 606. The output of the AND-gate 606 is provided on a line 662 to the OR-gates 530, and thus through the OR-gates 534 and the inverter 540. The signal on the line 542 will thus be a 75% duty cycle signal. Since a 75% duty signal corresponds to a logical one data bit, there is not a one-to-one relationship between the output of the shift register 632 and the signal on the line 542. This results because in the preferred embodiment, the data inputs to the shift register 632 are tied to the ground reference when a logical one data bit is desired and are tied to the positive battery voltage when a logical zero data bit is required. This is accomplished in the code select circuit 250, also shown in FIG. 12. The data inputs to the shift registers 632 on lines 634–648 are connected either to the positive battery bus represented by the designator 670 or the ground bus represented by the designator 672. In one embodiment, the connections can be performed manually by using jumper wires to either the positive voltage bus or the ground reference bus, using jumpers represented in dashed lines collectedly as 674. However, in another embodiment, the code select circuit 250 is provided as part of the same integrated circuit as the encoder logic circuit. The jumpers 674 are preferably integrated circuits paths which are selectively fabricated or laser cut during the manufacturing process. Thus, each integrated circuit will come out of the manufacturing process having a unique identification code. In the preferred embodiment, traces on the printed circuit board 56 (FIGS. 2 and 3) are abrasively or otherwise cut to selectively connect the data input lines 634–648 to either the positive voltage bus 620 or the ground reference bus 672 on the printed circuit board. Thus, all the integrated circuits can be manufactured identically, and the code selection can be done as part of the final manufacturing process of the printed circuit board.

Returning again to the AND-gate 544, the input to the AND-gate 544 on the line 546 corresponds to the inverted Q10 signal on the line 216. When Q10 becomes active high, the signal on the line 546 becomes inactive low, thus disabling the AND-gate 544, and preventing the signal on the line 542 from propagating through it. The signal Q10 on the line 216 becomes active after eight Q6 cycles and remains active for eight Q6 cycles. Thus, the signal Q10 causes the AND-gate 544 to allow eight frames to propagate through to the output and then suppresses the propagation of signals for eight frames. This is illustrated in FIG. 10b, described above. When Q10 again becomes inactive, eight additional frames of data are passed through the AND-gate 544, followed by the suppression of the data for eight additional frames. When the signal Q10 again goes inactive, the AND-gate 544 is enabled. However, at that time, the signal Q12 on the line 220 becomes active. The line 220 is connected to the input of the flip-flop 560. This causes the flip-flop 560 to be reset, causing the signal on the line 556 to become inactive, thus disabling the AND-gate 554. Thus, no data passes to the output line 562 until the line 556 again becomes active. The line 556 becomes active again when the clock signal to the flip-flop 560 on a line 680 makes a low to high transition, thus propagating the battery voltage signal on a line 682 through to the output. The line 680 is connected to output of an inverter 684. The input to the inverter 684 is the Q18 signal on the line 222. The Q18 signal has a frequency of 0.093 hertz, which corresponds to a period of approximately 10.7 seconds. The output of the flip-flop 560 on the line 556 will not become active again until Q18 goes high and then returns to its low state, approximately 10.7 seconds after the start of the cycle. Therefore, the output on the line 562 remains quiescent for more than 10 seconds as required by the Federal Communication's Commission.

The battery monitor circuit 240 is illustrated in FIG. 15. The battery monitor circuit comprises a comparator 700 which has a negative input on a line 702 which is connected to the anode of a diode 704 and to a first lead of a resistor 706. The cathode of the diode 704 is connected to a ground reference 710. The positive input to the comparator 700 is connected to a line 712 which is connected to a first lead of a resistor 714 and a first lead of a resistor 716. A second lead of the resistor 714 is connected to the ground reference 710. A second lead of the resistor 716 is connected via a line 720 to a second lead of the resistor 706 and to the power connection to the comparator 700. In the preferred embodiment, the line 720 is connected to the output of a buffer gate 722. The input to the buffer gate 722 is connected to the line 244 which is connected to the output of the flip-flop 560 on the line 556 shown in FIG. 12. Thus, the comparator 700 and the resistors 706 and 716 are only provided with power during the time that the encoder logic circuit 230 is transmitting active data. At other times, the comparator 700 and the resistor networks comprising the resistors 706, 716 and 714 are not consuming any power. Thus, the battery monitor circuit 240 provides a minimal amount of drain on the battery which it is monitoring.

The output of the battery monitor circuit is provided on the line 242 to the encoder logic circuit 230 illustrated in FIG. 12. The voltage on the line 712 connected to the resistors 714 and 716 is compared with the forward voltage drop across the diode 704. When the voltage of the battery drops below a predetermined limit, the voltage on the line 712 becomes lower than the voltage on the line 702. Thus, the output of the comparator 700 on the line 242 becomes low, indicating a low battery condition. The magnitudes of the resistors 714 and 716 can be advantageously selected to have the output of the comparator 700 on the line 242 switched at the predetermined low voltage level.

Figure 11:
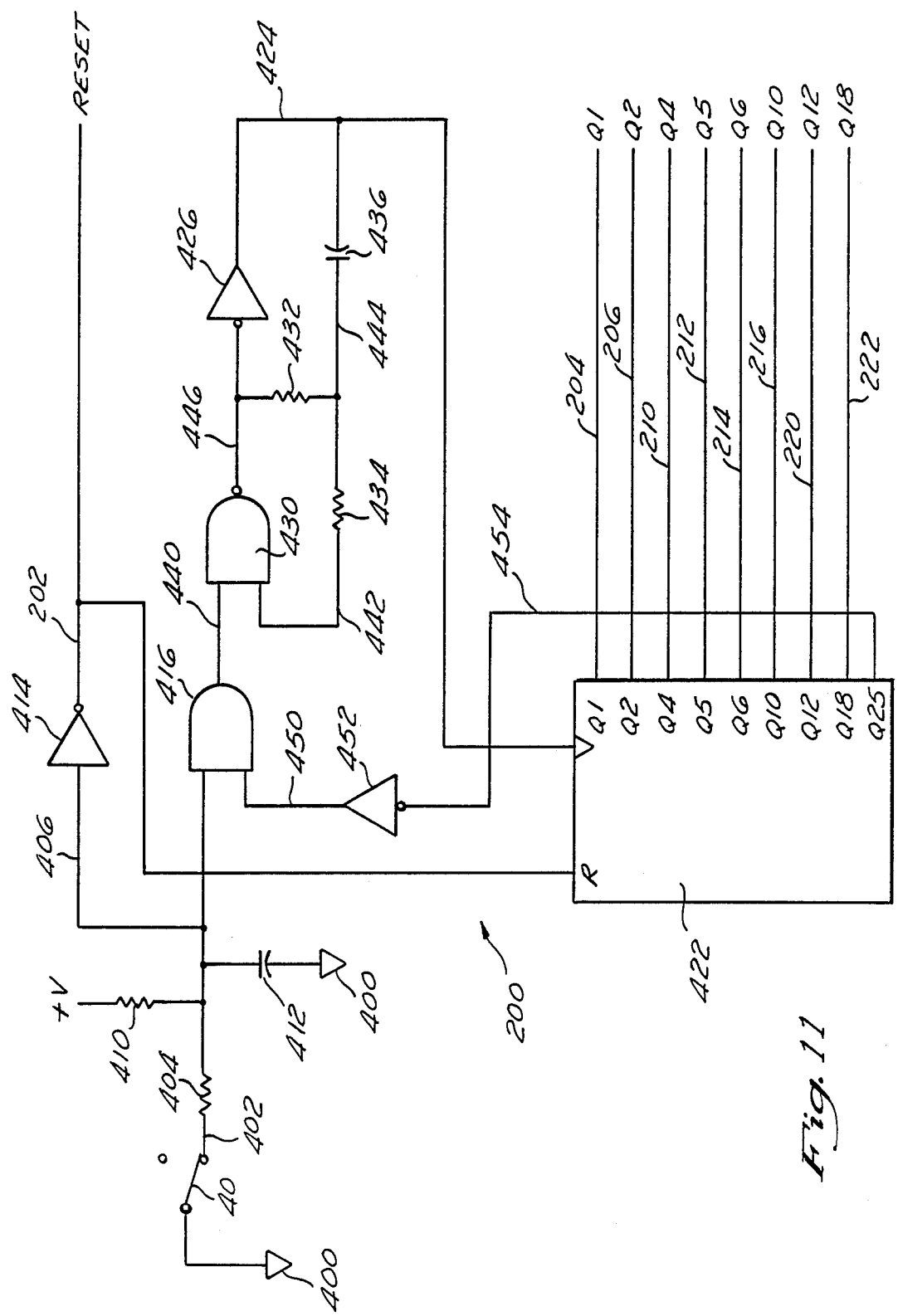
FIG. 11 is a detailed logic diagram of the clock generator circuit in the transmitter.

In alternative embodiments of the battery monitor circuit 240, the comparator 700 and the resistors 706 and 716 are connected directly to the battery 66 (not shown). Thus, the comparator 700 continuously monitors the battery voltage. When the battery voltage drops below the predetermined level, and the signal on the line 242 goes low, the encoder logic circuit 230 causes the low battery signal to be active in the transmitted signal. The low battery signal on the line 242 can be advantageously used as an input to the clock generator circuit 200 to initiate a transmission cycle although the air pressure in the tire is adequate to keep the switch closed. Although not shown in FIG. 11, one skilled in the art will recognize that the low battery signal can be inverted and logically OR'd with the signal on the line 406 to generate the inputs to the inverter 414 and the AND-gate 416 to start the clock and timing signals.

FIG. 16 illustrates one embodiment of the radio frequency transmitter 260. The radio frequency transmitter 260 has an input line 254 corresponding to the output line 254 in FIG. 12. The line 254 is connected to a first lead to a resistor 750. A second lead of the resistor 750 is connected to a line 752 which is connected to the base of an NPN transistor 754 and to a first lead of a capacitor 756. The emitter of the transistor 754 is connected to the line 262 which is connected to the antennae 264, shown in FIG. 8a. The line 262 is also connected to a first lead of a resistor 760. A second lead of a resistor 760 is connected to a ground reference 762. The collector of the transistor 754 is connected to a first lead of a capacitor 754 and to one end of a delay line 766, illustrated by a heavy line. A second lead of the capacitor 764 and a second end of the delay line 766 are connected to second lead of the capacitor 756. The battery voltage is connected to the delay line at a location between the two ends of the delay line. One skilled in the art will recognize that the radio frequency transmitter circuit 260 will oscillate when a high level voltage is applied to the resistor 570 via the line 254. The frequency of oscillation is determined by the capacitor 756, the capacitor 764, and the delay line 766. One skilled in the art will recognize that the frequency can be varied by adjusting the position of the capacitor 764 with respect to the ends of the delay line 766.

Although described above in connection with the preferred embodiment, one skilled in the art will recognize that various modifications to the above described circuitry can be made without going beyond the spirit and scope of the invention. For example, the number of identification data bits can be increased by increasing the length of the frame or by decreasing the number of start bits.

What is claimed is:

1. A tire pressure warning system, comprising: a first detector, comprising:
   a body portion having a bottom end adapted to mount on a tire valve stem, a top end opposite the bottom end, and an inside and an outside;
   a pressure transducer in said body for detecting the pressure in a tire;
   an electrical switch actuated by said pressure transducer such that said switch is in a first state at a predetermined low pressure and in a second state at any pressure above a predetermined, higher pressure;
   a sensor in said body for sensing whether said switch is in said first or second state;
   a transmitter in said body actuated by said sensor when said switch is in said first state for sending a plurlaity of discontinuous, modulated RF signal bursts of a predetermined code sequence through an RF output to indicate a tire pressure below said predetermined pressure;
   a counter in said body for counting the number of signal bursts transmitted and disabling the transmitter when a predetermined number of bursts have been transmitted in response to said switch continuing to said first state; and
control means associated with said detector for automatically re-enabling the disabled transmitter and initializing said counter only when said switch is returned to said second state from said first state, whereby said counter disables said transmitter only when the tire pressure is low for a predetermined time period and when the tire pressure changes from low to high pressure, said control means resets said counter and re-enables the disabled transmitter.

2. The system of claim 1, wherein said pressure transducer is at least partially metallic and said pressure transducer is coupled to said RF output so that said transducer functions as a transmitting antenna for said transmitter.

3. The system of claim 1, further comprising a battery inside said body portion for powering said transmitter, wherein said battery is metallic and is coupled to the RF output of the transmitter to function as an antenna.

4. The system of claim 1, further comprising:
a first seal in the bottom end of the body for isolating the transmitter from the pressure in a tire when the device is mounted on a valve stem;
a second seal in the top end of the body for isolating the transmitter from atmosphere; and
means for supplying power to the detector by deforming said second seal.

5. The system of claim 1, further comprising a receiver outside of said body for receiving signals from said transmitter, said receiver including:
means for receiving a transmission from said transmitter;
means for recognizing the code sequence transmitted by said transmitter; and
means for alerting a vehicle operator of a low tire condition.

6. The system of claim 5, further comprising a second detector differing from said first detector by transmitting a code sequence different from the code sequence of said first detector, and means in said receiver for recognizing and differentiating between the code sequence transmitted by said first detector and the code sequence transmitted by said second detector.

7. The system of claim 1, further comprising means to couple the RF output of the transmitter to a metal tire valve stem so that the valve stem functions as a transmitting antenna for said transmitter.

8. The system of claim 1 wherein said predetermined code sequence comprises a series of synchronization signals followed by a series of data signals.

9. The system of claim 8 wherein said series of data signals comprises at least one battery condition signal and a plurality of signals which identify the transmitter.

10. A tire pressure detector for use on a vehicle, comprising:
a body portion having an inside, an outside, a bottom end adapted to be coaxilly mounted on the valve stem of a pneumatic tire, and a top end opposite said bottom end;
a pressure sensor inside said body for detecting the pressure inside a tire;
a transmitter inside the body connected to said pressure sensor for transmitting a signal when the tire pressure drops below a predetermined level;
a power supply inside the body;
a power switch inside the body for supplying power from the power supply to the transmitter whether or not said sensor is mounted on the valve stem;
means for sealing the inside of the body from the outside of the body; and
means on the outside of the body for actuating the power switch without comprising the seal, said actuating means being capable of actuating the power switch whether or not said vehicle is moving and independent of the level of said tire pressure.

11. The detector of claim 10, wherein the power supply is a battery, and the sealing means, the power switch and the actuating means comprise:
an insulator on top of said battery;
an electrical conductor spaced from said battery by said insulator;
a rotatably cap threaded onto the top end of said body;
means in said body for sealing against said cap and isolating the inside of the body from the outside when said cap is theaded onto said body to a first predetermined portion; and
contact means extending from said cap axially into said body, said extending means pushing said conductor into electrical contact with said battery when said cap is threaded onto said body from said first position to a second predetermined position.

12. The detector of claim 11 further comprising:
means for limiting the angular rotation of said cap to movement only between said first position and said second position when said cap has been threaded onto said body at least as far as said first position.

13. The detector of claim 11, wherein said sealing means extends inside said body across the top end of said body beneath said cap and said extending means pushes said conductor into electrical contact with said battery by deforming said sealing means.

14. The detector of claim 11, wherein said contact means includes an axial extension from said cap into said body.

15. The device of claim 10 further comprising:
a cylindrical, axially-split, locking sleeve having a lower portion with a first inside diameter sufficient to receive said valve stem and an upper portion having a second inside diameter greater than said first inside diameter such that said second inside diameter receives said bottom end of said body portion of said detector; and
a fastener received by said locking sleeve for securing said axially-split portion around said valve stem.

16. A tire pressure warning system, comprising:
a tire pressure monitoring device comprising a housing, a battery inside the housing, an opening in the housing, means to monitor the pressure of air in the opening, means to attach the device to a tire to place the opening in fluid connection with the interior of the tire, means to transmit a plurality of first signals when the pressure in the opening is below a predetermined level, means for counting the number of first signals transmitted, means for disabling the transmitting means when the number of signals transmitted in response to a continuing low pressure in the opening equals a predetermined number, and means for re-enabling the disabled transmitting means and initializing the counting means when the pressure in the opening subsequently exceeds the predetermined level.

17. The warning system of claim 16, further comprising:
means to supply power to the device and to interrupt power to the device by turning the device on and off, and means for re-enabling the disabled transmitting means and initializing the counting means when the device is turned off and then is turned back on.

18. The system of claim 16, further comprising:
a receiver, separate from said monitoring device, comprising means for receiving said first signals from said monitoring device and means for indicating to the operator of a vehicle that said first signals have been received.

19. The system of claim 18, wherein the monitoring device further comprises:

means for detecting the battery level and means associated therewith for transmitting a plurality of second signals in response to a low battery condition; and wherein said receiver includes means for receiving said plurality of said second signals from said monitoring device, means for differentiating between said first signals and said second signals, and means for indicating to a vehicle operator the receipt of said second signals.

20. The system of claim 18, further comprising:

a second tire monitoring device including the elements of the first tire pressure monitoring device, except that the first signals transmitted by the second monitoring device are different from the first signals transmitted by the first monitoring device; and wherein said receiver further comprises means for receiving said first signals from said second monitoring device and means for differentiating between the signals transmitted by said first monitoring device and the signals transmitted by the second monitoring device, and means for indicating to a vehicle operator whether a received signal was received from said first monitoring device or said second monitoring device.

21. The system of claim 20, wherein the signals transmitted by said monitoring devices are encoded and wherein said receiver further comprises means for selecting and for altering the encoded signals recognized by said receiver.

22. The system of claim 21, further comprising means for altering the codes recognized by said receiver by plugging in dynamic data input means to supply a code to the receiver that is different from the code previously recognized by the receiver.

23. The system of claim 16, further comprising means fitting over a tire valve stem for locking to the valve stem and for preventing rotation of said monitoring device to prevent unauthorized or accidental removal of said monitoring device from the valve stem.

24. A tire pressure system, comprising: a detector, comprising:

a body portion having a bottom end adapted to mount on a tire valve stem, a top end, and an inside and an outside;

a pressure transducer in said body for detecting the pressure in a tire;

an electric switch actuated by said pressure transducer such that said switch is in said first state at a predetermined low pressure and in a second state at any pressure above a predetermined, higher pressure;

a sensor in said body for sensing whether said switch is in said first or second state;

a transmitter in said body actuated by said sensor when said switch is in said first state for sending an RF signal through an RF output to indicate a tire pressure below said predetermined pressure;

a first seal in the bottom end of said body for isolating the transmitter from the pressure in a tire when the device is mounted on a valve stem;

a second seal in the top end of said body for isolating the transmitter from the atmosphere; and means for supplying power to the said detector by deforming said second seal.

* * * * *